(12) United States Patent
Bradford et al.

(10) Patent No.: US 8,381,137 B2
(45) Date of Patent: Feb. 19, 2013

(54) EXPLICIT CHARACTER FILTERING OF AMBIGUOUS TEXT ENTRY

(75) Inventors: Ethan Robert Bradford, Seattle, WA (US); Keith Charles Hullfish, Snohomish, WA (US); David J. Kay, Seattle, WA (US); Pim Van Meurs, Seattle, WA (US); Michael R. Longe, Seattle, WA (US)

(73) Assignee: Tegic Communications, Inc., Seattle, WA (US)

( * ) Notice: Subject to any disclaimer, the term of this patent is extended or adjusted under 35 U.S.C. 154(b) by 289 days.

(21) Appl. No.: 12/725,334

(22) Filed: Mar. 16, 2010

(65) Prior Publication Data

US 2010/0174529 A1 Jul. 8, 2010

Related U.S. Application Data

(63) Continuation of application No. 10/176,933, filed on Jun. 20, 2002, now Pat. No. 7,712,053, which is a continuation-in-part of application No. 09/454,406, filed on Dec. 3, 1999, now Pat. No. 6,646,573.

(51) Int. Cl.
| | |
|---|---|
| *G06F 3/14* | (2006.01) |
| *G06F 3/048* | (2006.01) |
| *H04M 1/00* | (2006.01) |
| *H03M 11/00* | (2006.01) |

(52) U.S. Cl. .......... 715/864; 715/200; 715/773; 314/22; 400/485; 379/368

(58) Field of Classification Search .............. 715/864, 715/200, 773; 341/22; 379/368; 400/485
See application file for complete search history.

(56) References Cited

U.S. PATENT DOCUMENTS

| | | | |
|---|---|---|---|
| 3,967,273 | A | 6/1976 | Knowlton |
| 4,164,025 | A | 8/1979 | Dubnowski et al. |
| 4,191,854 | A | 3/1980 | Coles |
| 4,339,806 | A | 7/1982 | Yoshida |
| 4,360,892 | A | 11/1982 | Endfield |
| 4,396,992 | A | 8/1983 | Hayashi et al. |
| 4,427,848 | A | 1/1984 | Tsakanikas |
| 4,442,506 | A | 4/1984 | Endfield |
| 4,464,070 | A | 8/1984 | Hanft et al. |
| 4,481,508 | A | 11/1984 | Kamei et al. |
| 4,544,276 | A | 10/1985 | Horodeck |
| 4,586,160 | A | 4/1986 | Amano et al. |
| 4,649,563 | A | 3/1987 | Riskin |
| 4,661,916 | A | 4/1987 | Baker et al. |

(Continued)

FOREIGN PATENT DOCUMENTS

| | | |
|---|---|---|
| EP | 0313975 | 5/1989 |
| EP | 0319193 | 6/1989 |

(Continued)

OTHER PUBLICATIONS

Ajioka, Y. Anzai, Y. "Prediction of Nexet Alphabets and Words of Four Sentences by Adaptive Injunctions" IJCNN-91-Seattle: Int'l Joint Conference on Neural Networks (Cat. No. 91CH3049-4) p. 897, vol. 2; IEEE, NY, NY 1991 USA.

(Continued)

*Primary Examiner* — Eric Yen
(74) *Attorney, Agent, or Firm* — Michael A. Glenn; Glenn Patent Group

(57) ABSTRACT

The present invention relates to a method and apparatus for explicit filtering in ambiguous text entry. The invention provides embodiments including various explicit text entry methodologies, such as 2-key and long pressing. The invention also provides means for matching words in a database using build around methodology, stem locking methodology, word completion methodology, and n-gram searches.

34 Claims, 7 Drawing Sheets

U.S. PATENT DOCUMENTS

| | | | |
|---|---|---|---|
| 4,669,901 A | 6/1987 | Feng | |
| 4,674,112 A | 6/1987 | Kondraske et al. | |
| 4,677,659 A | 6/1987 | Dargan | |
| 4,744,050 A | 5/1988 | Hirosawa et al. | |
| 4,754,474 A | 6/1988 | Feinson | |
| RE32,773 E | 10/1988 | Goldwasser et al. | |
| 4,791,556 A | 12/1988 | Vilkaitis | |
| 4,807,181 A | 2/1989 | Duncan, IV et al. | |
| 4,817,129 A | 3/1989 | Riskin | |
| 4,866,759 A | 9/1989 | Riskin | |
| 4,872,196 A | 10/1989 | Royer et al. | |
| 4,891,786 A | 1/1990 | Goldwasser | |
| 4,969,097 A | 11/1990 | Levin | |
| 5,018,201 A | 5/1991 | Sugawara | |
| 5,031,206 A | 7/1991 | Riskin | |
| 5,041,967 A | 8/1991 | Ephrath et al. | |
| 5,067,103 A | 11/1991 | Lapeyre | |
| 5,109,352 A | 4/1992 | O'Dell | |
| 5,128,672 A | 7/1992 | Kaehler | |
| 5,131,045 A | 7/1992 | Roth | |
| 5,133,012 A | 7/1992 | Nitta | |
| 5,163,084 A | 11/1992 | Kim et al. | |
| 5,200,988 A | 4/1993 | Riskin | |
| 5,218,538 A | 6/1993 | Zhang | |
| 5,229,936 A | 7/1993 | Decker et al. | |
| 5,255,310 A | 10/1993 | Kim et al. | |
| 5,258,748 A | 11/1993 | Jones | |
| 5,288,158 A | 2/1994 | Matias | |
| 5,289,394 A | 2/1994 | Lapeyre | |
| 5,303,299 A | 4/1994 | Hunt et al. | |
| 5,305,205 A | 4/1994 | Weber et al. | |
| 5,339,358 A | 8/1994 | Danish et al. | |
| 5,371,851 A * | 12/1994 | Pieper et al. | 345/501 |
| 5,388,061 A | 2/1995 | Hankes | |
| 5,392,338 A | 2/1995 | Danish et al. | |
| 5,535,421 A | 7/1996 | Weinreich | |
| 5,559,512 A | 9/1996 | Jasinski et al. | |
| 5,642,522 A | 6/1997 | Zaenen et al. | |
| 5,664,896 A | 9/1997 | Blumberg | |
| 5,680,511 A | 10/1997 | Baker et al. | |
| 5,748,512 A | 5/1998 | Vargas | |
| 5,786,776 A | 7/1998 | Kisaichi et al. | |
| 5,797,098 A * | 8/1998 | Schroeder et al. | 455/464 |
| 5,805,911 A | 9/1998 | Miller | |
| 5,818,437 A * | 10/1998 | Grover et al. | 715/811 |
| 5,825,353 A | 10/1998 | Will | |
| 5,828,991 A | 10/1998 | Skiena et al. | |
| 5,847,697 A | 12/1998 | Sugimoto | |
| 5,855,000 A | 12/1998 | Waibel et al. | |
| 5,896,321 A | 4/1999 | Miller et al. | |
| 5,917,890 A | 6/1999 | Brotman et al. | |
| 5,917,941 A | 6/1999 | Webb et al. | |
| 5,926,566 A | 7/1999 | Wang et al. | |
| 5,936,556 A | 8/1999 | Sakita | |
| 5,937,380 A | 8/1999 | Segan | |
| 5,937,422 A | 8/1999 | Nelson et al. | |
| 5,945,928 A | 8/1999 | Kushler et al. | |
| 5,952,942 A | 9/1999 | Balakrishnan et al. | |
| 5,953,541 A | 9/1999 | King et al. | |
| 5,960,385 A | 9/1999 | Skiena et al. | |
| 5,963,671 A | 10/1999 | Comerford et al. | |
| 5,999,950 A | 12/1999 | Krueger et al. | |
| 6,005,498 A | 12/1999 | Yang et al. | |
| 6,009,444 A | 12/1999 | Chen | |
| 6,011,554 A * | 1/2000 | King et al. | 715/811 |
| 6,041,323 A | 3/2000 | Kubota | |
| 6,044,347 A * | 3/2000 | Abella et al. | 704/272 |
| 6,054,941 A | 4/2000 | Chen | |
| 6,073,101 A | 6/2000 | Maes | |
| 6,098,086 A | 8/2000 | Krueger et al. | |
| 6,104,317 A | 8/2000 | Panagrossi | |
| 6,120,297 A | 9/2000 | Morse, III et al. | |
| 6,130,628 A | 10/2000 | Schneider-Hufschmidt et al. | |
| 6,169,538 B1 | 1/2001 | Nowlan et al. | |
| 6,172,625 B1 | 1/2001 | Jin et al. | |
| 6,178,401 B1 | 1/2001 | Franz et al. | |
| 6,204,848 B1 | 3/2001 | Nowlan et al. | |
| 6,208,966 B1 | 3/2001 | Bulfer | |
| 6,219,731 B1 | 4/2001 | Gutowitz | |
| 6,223,059 B1 | 4/2001 | Haestrup | |
| 6,286,064 B1 | 9/2001 | King et al. | |
| 6,304,844 B1 | 10/2001 | Pan et al. | |
| 6,307,548 B1 * | 10/2001 | Flinchem et al. | 715/811 |
| 6,307,549 B1 * | 10/2001 | King et al. | 715/810 |
| 6,346,894 B1 | 2/2002 | Connolly et al. | |
| 6,362,752 B1 | 3/2002 | Guo et al. | |
| 6,363,347 B1 | 3/2002 | Rozak | |
| 6,377,965 B1 | 4/2002 | Hachamovitch et al. | |
| 6,392,640 B1 | 5/2002 | Will | |
| 6,421,672 B1 | 7/2002 | McAllister et al. | |
| 6,424,743 B1 | 7/2002 | Ebrahimi | |
| 6,466,232 B1 | 10/2002 | Newell et al. | |
| 6,502,118 B1 | 12/2002 | Chatterjee | |
| 6,542,170 B1 | 4/2003 | Williams et al. | |
| 6,559,778 B1 | 5/2003 | Hillmering | |
| 6,567,075 B1 | 5/2003 | Baker et al. | |
| 6,574,597 B1 | 6/2003 | Mohri et al. | |
| 6,584,179 B1 | 6/2003 | Fortier et al. | |
| 6,633,846 B1 | 10/2003 | Bennett et al. | |
| 6,636,162 B1 * | 10/2003 | Kushler et al. | 341/28 |
| 6,646,573 B1 * | 11/2003 | Kushler et al. | 341/28 |
| 6,665,640 B1 | 12/2003 | Bennett et al. | |
| 6,684,185 B1 | 1/2004 | Junqua et al. | |
| 6,686,852 B1 | 2/2004 | Guo | |
| 6,711,290 B2 | 3/2004 | Sparr et al. | |
| 6,728,348 B2 | 4/2004 | Denenberg et al. | |
| 6,734,881 B1 * | 5/2004 | Will | 715/811 |
| 6,738,952 B1 | 5/2004 | Yamamuro | |
| 6,751,605 B2 | 6/2004 | Gunji et al. | |
| 6,757,544 B2 | 6/2004 | Rangarajan et al. | |
| 6,801,190 B1 | 10/2004 | Robinson et al. | |
| 6,801,659 B1 * | 10/2004 | O'Dell | 382/185 |
| 6,807,529 B2 | 10/2004 | Johnson et al. | |
| 6,864,809 B2 | 3/2005 | O'Dell et al. | |
| 6,885,317 B1 | 4/2005 | Gutowitz | |
| 6,912,581 B2 | 6/2005 | Johnson et al. | |
| 6,934,564 B2 | 8/2005 | Laukkanen et al. | |
| 6,947,771 B2 | 9/2005 | Guo et al. | |
| 6,955,602 B2 | 10/2005 | Williams | |
| 6,956,968 B1 | 10/2005 | O'Dell et al. | |
| 6,973,332 B2 | 12/2005 | Mirkin et al. | |
| 6,982,658 B2 | 1/2006 | Guo | |
| 6,985,933 B1 | 1/2006 | Singhal et al. | |
| 7,006,820 B1 | 2/2006 | Parker et al. | |
| 7,013,258 B1 | 3/2006 | Su et al. | |
| 7,020,849 B1 | 3/2006 | Chen | |
| 7,027,976 B1 | 4/2006 | Sites | |
| 7,030,863 B2 * | 4/2006 | Longe et al. | 345/173 |
| 7,057,607 B2 | 6/2006 | Mayoraz et al. | |
| 7,061,403 B2 | 6/2006 | Fux | |
| 7,075,520 B2 | 7/2006 | Williams | |
| 7,095,403 B2 | 8/2006 | Lyustin et al. | |
| 7,098,896 B2 | 8/2006 | Kushler et al. | |
| 7,139,430 B2 | 11/2006 | Sparr et al. | |
| 7,152,213 B2 | 12/2006 | Pu et al. | |
| 7,224,292 B2 | 5/2007 | Lazaridis et al. | |
| 7,256,769 B2 | 8/2007 | Pun et al. | |
| 7,257,528 B1 | 8/2007 | Ritchie et al. | |
| 7,272,564 B2 | 9/2007 | Phillips et al. | |
| 7,313,277 B2 | 12/2007 | Morwing et al. | |
| 7,349,576 B2 | 3/2008 | Holtsberg | |
| 7,386,454 B2 | 6/2008 | Gopinath et al. | |
| 7,389,235 B2 | 6/2008 | Dvorak | |
| 7,395,203 B2 | 7/2008 | Wu et al. | |
| 7,437,001 B2 | 10/2008 | Morwing et al. | |
| 7,466,859 B2 | 12/2008 | Chang et al. | |
| 7,598,890 B2 * | 10/2009 | Park et al. | 341/22 |
| 7,626,574 B2 * | 12/2009 | Kim | 345/168 |
| 7,679,534 B2 * | 3/2010 | Kay et al. | 341/22 |
| 2001/0040517 A1 | 11/2001 | Kisaichi et al. | |
| 2002/0019731 A1 | 2/2002 | Masui et al. | |
| 2002/0038207 A1 | 3/2002 | Mori et al. | |
| 2002/0072395 A1 | 6/2002 | Miramontes | |
| 2002/0097227 A1 | 7/2002 | Chu et al. | |
| 2002/0119788 A1 | 8/2002 | Parupudi et al. | |
| 2002/0126097 A1 | 9/2002 | Savolainen | |
| 2002/0135499 A1 | 9/2002 | Guo |

| | | | |
|---|---|---|---|
| 2002/0145587 A1 | 10/2002 | Watanabe | |
| 2002/0152075 A1 | 10/2002 | Kung et al. | |
| 2002/0188448 A1 | 12/2002 | Goodman et al. | |
| 2002/0196163 A1* | 12/2002 | Bradford et al. | 341/22 |
| 2003/0011574 A1 | 1/2003 | Goodman | |
| 2003/0023420 A1 | 1/2003 | Goodman | |
| 2003/0023426 A1 | 1/2003 | Pun et al. | |
| 2003/0036411 A1* | 2/2003 | Kraft | 455/566 |
| 2003/0054830 A1 | 3/2003 | Williams et al. | |
| 2003/0078038 A1 | 4/2003 | Kurosawa et al. | |
| 2003/0088398 A1 | 5/2003 | Guo et al. | |
| 2003/0095102 A1 | 5/2003 | Kraft et al. | |
| 2003/0104839 A1 | 6/2003 | Kraft et al. | |
| 2003/0119561 A1 | 6/2003 | Hatch et al. | |
| 2003/0144830 A1 | 7/2003 | Williams | |
| 2003/0179930 A1 | 9/2003 | O'Dell | |
| 2003/0193478 A1 | 10/2003 | Ng | |
| 2004/0049388 A1 | 3/2004 | Roth et al. | |
| 2004/0052355 A1* | 3/2004 | Awada et al. | 379/355.01 |
| 2004/0067762 A1 | 4/2004 | Balle | |
| 2004/0127197 A1 | 7/2004 | Roskind | |
| 2004/0127198 A1 | 7/2004 | Roskind et al. | |
| 2004/0135774 A1 | 7/2004 | La Monica | |
| 2004/0153963 A1 | 8/2004 | Simpson et al. | |
| 2004/0153975 A1 | 8/2004 | Williams et al. | |
| 2004/0155869 A1 | 8/2004 | Robinson et al. | |
| 2004/0163032 A1 | 8/2004 | Guo et al. | |
| 2004/0169635 A1 | 9/2004 | Ghassabian | |
| 2004/0201607 A1 | 10/2004 | Mulvey et al. | |
| 2004/0203656 A1 | 10/2004 | Andrew et al. | |
| 2004/0259598 A1 | 12/2004 | Wagner et al. | |
| 2005/0017954 A1 | 1/2005 | Kay et al. | |
| 2005/0114770 A1 | 5/2005 | Sacher et al. | |
| 2006/0007162 A1 | 1/2006 | Kato | |
| 2006/0010206 A1 | 1/2006 | Apacible et al. | |
| 2006/0129928 A1 | 6/2006 | Qiu | |
| 2006/0136408 A1 | 6/2006 | Weir et al. | |
| 2006/0155536 A1 | 7/2006 | Williams et al. | |
| 2006/0158436 A1 | 7/2006 | LaPointe et al. | |
| 2006/0173807 A1 | 8/2006 | Weir et al. | |
| 2006/0190822 A1 | 8/2006 | Basson et al. | |
| 2006/0193519 A1 | 8/2006 | Sternby | |
| 2006/0236239 A1 | 10/2006 | Simpson et al. | |
| 2006/0239560 A1 | 10/2006 | Sternby | |
| 2007/0094718 A1 | 4/2007 | Simpson | |
| 2007/0203879 A1 | 8/2007 | Templeton-Steadman et al. | |
| 2007/0276814 A1 | 11/2007 | Williams | |
| 2007/0285397 A1 | 12/2007 | LaPointe et al. | |
| 2008/0130996 A1 | 6/2008 | Sternby | |

FOREIGN PATENT DOCUMENTS

| | | |
|---|---|---|
| EP | 0464726 | 1/1992 |
| EP | 0540147 | 5/1993 |
| EP | 0651315 | 5/1995 |
| EP | 0660216 | 6/1995 |
| EP | 0732646 | 9/1996 |
| EP | 0751469 | 1/1997 |
| EP | 1031913 | 8/2000 |
| EP | 1035712 | 9/2000 |
| EP | 1296216 | 3/2003 |
| EP | 1320023 | 6/2003 |
| EP | 1324573 | 7/2003 |
| EP | 1347361 | 9/2003 |
| EP | 1347362 | 9/2003 |
| GB | 2298166 | 8/1996 |
| GB | 2383459 | 6/2003 |
| JP | A 1990-117218 | 5/1990 |
| JP | 1993265682 | 10/1993 |
| JP | A 1993-265682 | 10/1993 |
| JP | 8006939 | 1/1996 |
| JP | 1997114817 | 5/1997 |
| JP | A 1997-114817 | 5/1997 |
| JP | 1997212503 | 8/1997 |
| JP | A 1997-212503 | 8/1997 |
| JP | A 2002-351862 | 12/2002 |
| WO | WO82/00442 | 2/1982 |
| WO | WO90/07149 | 6/1990 |
| WO | WO96/27947 | 9/1996 |
| WO | WO97/04580 | 2/1997 |
| WO | WO97/05541 | 2/1997 |
| WO | 0035091 | 6/2000 |
| WO | 03058420 A2 | 7/2003 |
| WO | WO03/058420 | 7/2003 |
| WO | WO03/060451 | 7/2003 |
| WO | WO2004/111871 | 6/2004 |
| WO | WO2004/111812 | 12/2004 |
| WO | WO2006/026908 | 8/2005 |

OTHER PUBLICATIONS

"Latest Philips Wireless Handset Ships With T9 Text Input in China", Business Wire, Nov. 9, 1999, pp. 1-2 (downloaded from: www.businesswire.com/webbox/bw.110999/193130342.htm).

Arnott, J.L., et al; Probabilistic Character Disambiguation for Reduced Keyboards Using Small Text Samples; Dept. Math & comp. Sci.; Univ of Dundee, Dundee, Tayside, Scotland; AAC Augmentative and Alternative Communication ; vol. 8, Sep. 1992; Copyright 1992 by ISAAC.

Butts, L., Cockburn, A., "An Evaluation of Mobile Phone Text Input Methods", University of Canterbury, Dept of Computer Science, Christchurch, New Zealand AUIC2002, Melbourne Australia, Conferences in Research and Practice in Information Technology, vol. 7; Copyright 2001, Australian Computer Society.

Cockburn, A., Siresena, "Evaluating Mobile Text Entry with Fastap™ Keyboard"; 2003; People and Computers XVII (vol. 2): British Computer Society Conference on Human Computer Interaction. Bath, England. pp. 77-80.

Coppola, P. et al, Mobe: a framework for context-aware mobile applications. In: Proc. of Workshop on Context Awareness for Proactive Systems (CAPS2005), Helsinki University Press, 2005; ISBN:952-10-2518-2.

Demasco, Patrick W., et al., "Generating Text From Compressed Input: An Intelligent Interface for People with Sever Motor Impairments", Communications of the ACM, vol. 35 No. 5, May 1992, pp. 68-78.

Dey, A.K. and Abowd, G. D. (1999). Towards a better understanding of context and context-awareness. GVU Technical Report GIT-GVU-99-2, GVU Center, 1999.

Foulds, R., et al. "Lexical Prediction Techniques Applied to Reduce Motor Requirements for Augmentative Communication," RESNA 10th Annula Conference, San Jose, California, 1987, pp. 115-117.

Foulds, R., et al., "Statistical Disambiguation of Multi-Character Keys Applied to Reduce Motor Requirements for Augmentative and Alternative Communication," AAC Augmentative and Alternative Communication (1987), pp. 192-195.

Gavalda, M. "Epiphenomenal Grammar Acquisition with GSG"; May 2000; Proceedings of the Workshop on Conversational Systems of the 6th Conf. on Applied Natural Language Processing and the 1st Conf. of the N. American Chapter of the Assoc. for Computational Linguistics (ANLP/NAACL-2000), Seattle, Washington.

http://pitecan.com/OpenPOBox/info/index.html; Jul. 23, 2001.

http://www.ling.upenn.edu/courses/Fall_2003/ling001/reading_writing.html. What is writing? Linguistics 001. Lecture 19. Reading and Writing 2003.

http://www.pinyin.info/readings/texts/ideographic_myth.html. The Ideographic Myth. 1984.

IBM Technical Disclosure Bulletin, "Speed Keyboard for Data Processor," vol. 23, 3 pages, Jul. 1980. IBM Corp., 1993.

James, Christina L., et al., "Text Input for Mobile Devices: Comparing Model Prediction to Actual Performance", SIGCHI '01, Seattle, WA, Mar. 31-Apr. 4, 2001, pp. 365-371 [ACM 1-58113-327-8/01/0003].

James, Christina, et al., "Bringing Text Input Beyond the Desktop", CHI 2000, Seattle, WA, Apr. 1-6, 2000, pp. 49-50.

Kamphuis, H., et al., "Katdas; A Small Number of Keys Direct Access System," RESNA 12th Annual Conference, New Orleans, Louisiana, 1989, pp. 278-279.

King, M.T., "JustType-Efficient Communication with Eight Keys," Proceedings of the RESNA '95 Annual Conference, Vancouver, BC, Canada, 1995, 3 pages.

Kreifeldt, J.G., et al., "Reduced Keyboard Designs Using Disambiguation," Proceedings of the Human Factors Society 33rd Annual Meeting, 1989, pp. 441-444.

Kronlid, F., Nilsson, V. "TreePredict, Improving Text Entry on PDA's"; 2001; Proceedings of the Conference on Human Factors in Computing Systems (CHI2001), ACM press, pp. 441-442.

Kushler, Cliff, "AAC Using a Reduced Keyboard", downloaded from: www.dinf.ne.jp/doc/english/Us_Eu/conf/csun_98/csun98_140.htm, Web Posted Mar. 3, 1998, pp. 1-4.

Lesher, Gregory W. et al.; "Optimal Character Arrangements for Ambiguous Keyboards"; Dec. 1998; IEEE Transactions on Rehabilitation Engineering, vol. 6, No. 4, pp. 415-423.

Levine, S.H., "An Adaptive Approach to Optimal Keyboard Design for Nonvocal Communication," IEEE, 1985, pp. 334-337.

Levine, S.H., et al., "Adaptive Technique for Customized Interface Design With Application to Nonvocal Communication," RESNA 9th Annual Conference, Minneapolis, Minnesota, 1986, pp. 399-401.

Levine, S.H., et al., "Computer Disambiguation of Multi-Character Key Text Entry: An Adaptive Design Approach," IEEE, 1986, pp. 298-301.

Levine, S.H., et al., "Multi-Character Key Text Entry Using Computer Disambiguation," RESNA 10th Annual Conference, San Jose, California, 1987, pp. 177-178.

MacKenzie, et al; "Text Entry for Mobile Computing: Models and Methods, Theory and Practice" ;Sep. 6 2002; retrieved from website www.yorku.ca/mack/hci3.html.

MacKenzie, I. Scott, et al., "LetterWise: Prefix-based Disambiguation for Mobile Text Input", UIST '01, Orlando, FL, Nov. 11-14, 2001, pp. 111-120 [ACM 1-58113-438-x/01/11].

Making Multi-tap Intelligent; retrieved Feb. 7, 2006 from website: http://www.zicorp.com/ezitap.htm.

Martin, T.Azvine, B., "Learning User Models for an Intelligent Telephone Assistant"; Proceedings Joint $9^{th}$ IFSA World Congress and $20^{th}$ NAFIPS Intnl. Conf. (Cat. No. 01TH8569) Part vol. 2, p. 669-74 vol. 2; IEEE 2001, Piscataway, NJ, USA.

Masui, "POBox: An efficient Text Input Method for Handheld and Ubiquitous Computers"; Sep. 1999; In Proc. of the International Symposium on Handheld and Ubiquitious Computing (HUC '99), pp. 289-300.

Matias, E., et al., "Half-QWERTY: Typing With One Hand Using Your Two-Handed Skills," Conference Companion, CHI '94 (Apr. 24-28, 1994), pp. 51-52.

Minneman, S.L., "A Simplified Touch-Tone Telecommunication Aid for Deaf and Hearing Impaired Individuals," RESNA 8th Annual Conference, Memphis Tennessee, 1985, pp. 209-211.

Motorola Lexicus Technologies & SOK's iTAP page; Sep. 6, 2002, retrieved from: www.motorola.com/lexicus/html/itap_FAQ.html.

News Release from Zi Corporation, "Zi Claims Second Patent Victory Against Tegic Communications, a unit of AOL Time Warner", Mar. 14, 2002, pp. 1-2 (downloaded from: www.zicorp.com/pressreleases/031402.html.

Oommen, B. John, et al.; "String Taxonomy Using Learning Automata"; Apr. 1997; IEEE Transactions on Systems, Mand and Cybernetics—Part B: Cybernetics, vol. 27 No. 20 pp. 354-365.

Oommen, B.J., et al., "Correction to 'An Adaptive Learning Solution to the Keyboard Optimization Problem'." IEEE Transactions on Systems, Man and Cybernetics, vol. 22, No. 5 (Oct. 1992) pp. 1233-1243.

Oviatt,S. "Mutual Disambiguation of Recognition Errors in a Multimodal Architecture." Chi 99. May 15-29, 1999.

Press Release from Tegic Communications, "America Online, Inc. Acquires Tegic Communications", Dec. 1, 1999, pp. 1-3 (downloaded from: www.tegic.com/pressreleases/pr_aolacquisition.html).

Rosa, J. "Next Word Prediction in a Connectional Distributed Representation System"; 2002 IEEEE Intnl Conference on Systems, man and Cybernetics; Conf. Proceedings (Cat. No. 02CH37349) Part vol. 3, p. 6, Yasmine Hammamet, Tunisia, Oct. 2002.

Rosa, J., "A Biologically Motivated Connectionist System for Predicting the Next Word In Natural Language Sentences", 2002 IEEEE Intnl Conference on Systems, man and Cybernetics; Conf. Proceedings (Cat. No.: 02CH37349) Part vol. 4, p. 6, Yasmine Hammamet, Tunisia, Oct. 2002.

Schmidt, A. et al; Advanced Interaction in Context, In Proceedings of First International Symposium of Handheld and Ubiquitous Computing, pp. 89-101, Karlsruhe, Germany, Sep. 1999.

Shieber, S., Baker, E., "Abbreviated Text Input", Harvard University, Cambridge, MA, USA shieber@deas.harvard.edu ellie@eecs.harvard.edu; IUI'03, Jan. 12-15, 2003, ACM 1-58113-586-6/03/0001.

Siewiorek, D.P., et al, SenSay: A context-aware mobile phone. In proceedings of the 7th International Symposium on Wearable Computers, pp. 248-249, IEEE Press, 2003.

Silfverberg, Miika, et al., "Predicting Text Entry Speed on Mobile Phones", CHI 2000, The Hague, Amsterdam, Apr. 1-6, 2000, pp. 9-16 [ACM 1-58113-216-6/00/04].

Smith, Sidney L., et al., "Alphabetic Data Entry Via the Touch-Tone Pad: A Comment," Human Factors, 13(2), Apr. 1971, pp. 189-190.

Sugimoto, M., et al., "SHK: Single Hand Key Card for Mobile Devices," CHI 1996 (Apr. 13-18, 1996), pp. 7-8.

Sugimoto, Masakatsu, "Single-Hand Input Scheme for English and Japanese Text", Fujitsu Sci. Tech.J., vol. 33 No. 2, Dec. 1997, pp. 189-195.

Suhm B., et al. "Multimodal Error Correction for Speech User Interfaces" ACM Transactions on Computer-Human Interaction, vol. 8. Mar. 2001.

Summary Judgment Orders, *Zi Corporation, Inc.* v. *Tegic Communications, Inc.*, Mar. 13, 2002, pp. 1-7 (downloaded from: www.zicorp.com/pressreleases/031402.html).

Swiffin, A.L., et al., "Adaptive and Predictive Techniques in a Communications Prosthesis," AAC Augmentative and Alternative Communication, (1987), pp. 181-191.

Swiffin, A.L., et al., "PAL: An Effort Efficient Portable Communication Aid and Keyboard Emulator," RESNA 8th Annual Conference, Memphis, Tennessee, 1985, pp. 197, 199.

Tapless ppd Gen3.0; retrieved Feb. 7, 2006 from website: http://www.tapless.biz/.

Tygran, Amalyan, "T9 or Text Predicative Input in Mobile Telephones", Business Wire, Jul. 23, 2001, pp. 1-5 (downloaded from: web.archive.org/wweb/20010723054055/http://www.digit-life.com/articles/mobilet9/).

Welcome to the Nuance corporate Website; retrieved on Feb. 7, 2006 from website: http://www.nuance.com/.

Witten, I.H., Principles of Computer Speech, New York: Academic Press, (1982), pp. 246-253.

WordLogic for Handheld Computers—http://web.archive.org/web/20051030092534/www.wordlogic.com/products-predictive-keyboard-handheld-prediction.asp ; Oct. 30, 2005; retrieved from webarchive.org.

Xu, Jinxi, et al., "Corpus-Based Stemming Using Cooccurrence of Word Variants", ACM Transactions on Information Systems, vol. 16 No. 1, Jan. 1998, pp. 61-81 [ACM 1046-8188/98/0100-0061].

Yang, Y., Pedersen, J., "A Comparative Study on Feature Selection in Text Categorization"; 1997; Proceedings of ICML'1997, pp. 412-420.

Zernik, U., "Language Acquisition: Coping with Lexical Gaps", Aug. 22-27, 1998; Proceedings of the 12th International Conference on Computational Linguistics, Budapest, Hungary. pp. 796-800.

"POBox Server", http://pitecan.com/OpenPOBox/info/index.html, Jul. 23, 2001, Total of 1 page.

Ajioka, Y., "Prediction of Nexet Alphabets and Words of Four Sentences by Adaptive Injunctions", IJCNN-91-Seattle: Int'l Joint Conference on Neural Networks, Anzai, Y (Additional Author), Cat. No. 91CH3049-4, vol. 2; IEEE, NY, NY USA, 1991, 897.

* cited by examiner

| KEY | UNSHIFTED CHARACTERS | | | | | | SHIFTED CHARACTERS | | | | | |
|---|---|---|---|---|---|---|---|---|---|---|---|---|
| 1 | . | , | - | ? | ! | ' | . | , | - | ? | ! | ' |
|   | @ | : | 1 | | | | @ | : | 1 | | | |
| 2 | a | b | c | ç | à | â | A | B | C | Ç | À | Â |
|   | á | ä | 2 | | | | Á | Ä | 2 | | | |
| 3 | d | e | f | é | è | ê | D | E | F | É | È | Ê |
|   | ë | 3 | | | | | Ë | 3 | | | | |
| 4 | g | h | i | î | ï | í | G | H | I | Î | Ï | Í |
|   | 4 | | | | | | 4 | | | | | |
| 5 | j | k | l | 5 | | | J | K | L | 5 | | |
| 6 | m | n | o | ô | ó | ö | M | N | O | Ô | Ó | Ö |
|   | ñ | 6 | | | | | Ñ | 6 | | | | |
| 7 | p | q | r | s | β | 7 | P | Q | R | S | | 7 |
| 8 | t | u | v | ù | û | ú | T | U | V | Ù | Û | Ú |
|   | ü | 8 | | | | | Ü | 8 | | | | |
| 9 | w | x | y | z | 9 | | W | X | Y | Z | 9 | |
| 0 | 0 | | | | | | 0 | | | | | |

*FIG. 3*

EXPLICIT CHARACTER FILTERING OF AMBIGUOUS TEXT ENTRY

CROSS-REFERENCE TO RELATED APPLICATIONS

This application is a Continuation of U.S. patent application Ser. No. 10/176,933 filed 20 Jun. 2002, now U.S. Pat. No. 7,712,053 which is a Continuation-in-Part of U.S. patent application Ser. No. 09/454,406, filed Dec. 3, 1999, now U.S. Pat. No. 6,646,573 entitled "REDUCED KEYBOARD TEXT INPUT SYSTEM FOR THE JAPANESE LANGUAGE". The disclosure of this application is hereby incorporated by reference in its entirety.

BACKGROUND OF THE INVENTION

1. Technical Field

The invention relates to text input technology. More specifically, the invention relates to text entry solutions to wireless communication devices with limited keypads.

2. Description of the Prior Art

For many years, portable computers have been getting smaller and smaller. The principal size-limiting component in the effort to produce a smaller portable computer has been the keyboard. If standard typewriter-size keys are used, the portable computer must be at least as large as the keyboard. Miniature keyboards have been used on portable computers, but the miniature keyboard keys have been found to be too small to be easily or quickly manipulated by a user. Incorporating a full-size keyboard in a portable computer also hinders true portable use of the computer. Most portable computers cannot be operated without placing the computer on a flat work surface to allow the user to type with both hands. A user cannot easily use a portable computer while standing or moving.

In the latest generation of small portable computers, called Personal Digital Assistants (PDAs), companies have attempted to address this problem by incorporating handwriting recognition software in the PDA. A user may directly enter text by writing on a touch-sensitive panel or screen. This handwritten text is then converted by the recognition software into digital data. Unfortunately, in addition to the fact that printing or writing with a pen is in general slower than typing, the accuracy and speed of the handwriting recognition software has to date been less than satisfactory.

Presently, a tremendous growth in the wireless industry has spawned reliable, convenient, and very popular mobile communications devices available to the average consumer, such as cell phones, two-way pagers, PDAs, etc. These handheld wireless communications and computing devices requiring text input are becoming smaller still. Recent advances in two-way paging, cellular telephones, and other portable wireless technologies have led to a demand for small and portable two-way messaging systems, and especially for systems which can both send and receive electronic mail ("e-mail"). Some wireless communications device manufacturers also desire to provide to consumers devices with which the consumer can operate with the same hand that is holding the device.

Disambiguation Background.

Prior development work has considered use of a keyboard that has a reduced number of keys. As suggested by the keypad layout of a touch-tone telephone, many of the reduced keyboards have used a 3-by-4 array of keys. Each key in the array of keys contains multiple characters. There is therefore ambiguity as a user enters a sequence of keys, since each keystroke may indicate one of several letters. Several approaches have been suggested for resolving the ambiguity of the keystroke sequence, referred to as disambiguation.

One suggested approach for unambiguously specifying characters entered on a reduced keyboard requires the user to enter, on average, two or more keystrokes to specify each letter. The keystrokes may be entered either simultaneously (chording) or in sequence (multiple-stroke specification). Neither chording nor multiple-stroke specification has produced a keyboard having adequate simplicity and efficiency of use. Multiple-stroke specification is inefficient, and chording is complicated to learn and use.

Other suggested approaches for determining the correct character sequence that corresponds to an ambiguous keystroke sequence are summarized in the article "Probabilistic Character Disambiguation for Reduced Keyboards Using Small Text Samples," published in the Journal of the International Society for Augmentative and Alternative Communication by John L. Arnott and Muhammad Y. Javad (hereinafter the "Arnott article"). The Arnott article notes that the majority of disambiguation approaches employ known statistics of character sequences in the relevant language to resolve character ambiguity in a given context.

Another suggested approach based on word-level disambiguation is disclosed in a textbook entitled Principles of Computer Speech, authored by I. H. Witten, and published by Academic Press in 1982 (hereinafter the "Witten approach"). Witten discusses a system for reducing ambiguity from text entered using a telephone touch pad. Witten recognizes that for approximately 92% of the words in a 24,500 word dictionary, no ambiguity will arise when comparing the keystroke sequence with the dictionary. When ambiguities do arise, however, Witten notes that they must be resolved interactively by the system presenting the ambiguity to the user and asking the user to make a selection between the number of ambiguous entries. A user must therefore respond to the system's prediction at the end of each word. Such a response slows the efficiency of the system and increases the number of keystrokes required to enter a given segment of text.

H. A. Gutowitz, Touch-Typable Devices Based on Ambiguous Codes and Methods to Design Such Devices, WO 00/35091 (Jun. 15, 2000) discloses that the design of typable devices, and, in particular, touch-type devices embodying ambiguous codes presents numerous ergonomical problems and proposes some solutions for such problems. Gutowitz teaches methods for the selection of ambiguous codes from the classes of strongly-touch-typable ambiguous codes and substantially optimal ambiguous codes for touch-typable devices such as computers, PDA's, and the like, and other information appliances, given design constraints, such as the size, shape and computational capacity of the device, the typical uses of the device, and conventional constraints such as alphabetic ordering or Qwerty ordering.

Eatoni Ergonomics Inc. provides a system called WordWise, (Copyright 2001 Eatoni Ergonomics Inc.), adapted from a regular keyboard, and where a capital letter is typed on a regular keyboard, and an auxiliary key, such as the shift key, is held down while the key with the intended letter is pressed. The key idea behind WordWise is to choose one letter from each of the groups of letters on each of the keys on the telephone keypad. Such chosen letters are typed by holding down an auxiliary key while pressing the key with the intended letter. WordWise does not use a vocabulary database/dictionary to search for words to resolve ambiguous, unambiguous, or a combination thereof entries.

Zi Corporation teaches a predictive text method, eZiText® (2002 Zi Corporation), but does not teach nor anywhere suggest explicit text filtering in ambiguous mode, nor in combination with 2-key explicit entry, stem-locking, or n-gram searches.

A Need for Improvements to Current Disambiguation Methodologies.

Disambiguating an ambiguous keystroke sequence continues to be a challenging problem. A specific challenge facing disambiguation is providing sufficient feedback to the user about the keystrokes being input. With an ordinary typewriter or word processor, each keystroke represents a unique character which can be displayed to the user as soon as it is entered. But with word-level disambiguation, for example, this is often not possible, because each entry represents multiple characters, and any sequence of entries may match multiple objects, such as, words or word stems, for example. Such ambiguity is especially a problem when, for example, the user makes a spelling or entry error and the user is not certain of such error until the complete sequence is entered and the desired result is not presented. In another example, previous systems utilizing word-level disambiguation fail to provide any feedback until a predetermined selection, such as a specific key selection, is made that is recognizable by the system as a termination selection, e.g. the space key.

Moreover, some alphabets, such as Thai and Arabic, contain more letters than the alphabet for English, which leads to even greater ambiguity on a reduced number of keys. Efficient input of these languages demands a mechanism for reducing that ambiguity when needed.

Therefore, it would be advantageous to provide a disambiguating system which reduces the apparent ambiguity on the display during entry and improves the user's ability to detect and correct spelling and/or entry errors.

It would also be advantageous to provide a disambiguating system which reduces ambiguity and increases efficiency by providing explicit filtering capabilities such that a list of candidate words, word stems, sequence of symbols, and the like, is narrowed, and the user can subsequently be offered a word completion or sequence completion quicker. More specifically, it would be advantageous to allow locking in a current state of interpretation of a part of or all of previously entered characters including, but not limited to an object and/or word stems, and explicitly entered characters, thereby preventing reinterpretation of previous entries.

It would also be advantageous to build around explicitly entered characters as anchors, for the end of or beginning of new objects, words, or word stems.

It would also be advantageous to offer reasonable guesses for extending objects or words by n-gram analysis of preceding explicitly entered characters.

It would also be advantageous to reduce ambiguity and increase efficiency during the process of disambiguating a linguistic object, such as a word or word stem, for example, by preventing reinterpretation of previous entries.

It would also be advantageous to recognize common delimiters entered ambiguously or explicitly as suggesting a point connecting two separate sets of characters to suggest where the interpretation of keystrokes could be restarted.

SUMMARY OF THE INVENTION

The present invention relates to a method and apparatus for explicit filtering in ambiguous text entry. The invention provides embodiments including various explicit text entry methodologies, such as 2-key and long pressing. The invention also provides means for matching words in a database using build around methodology, stem locking methodology, word completion methodology, and n-gram searches.

BRIEF DESCRIPTION OF THE DRAWINGS

FIG. 3 is an example chart of European letters and some special symbols shown on the 0-9 keys and their respective Shift keys according to the invention;

DETAILED DESCRIPTION OF THE INVENTION

The present invention relates to a method and apparatus for explicit filtering in ambiguous text entry. The invention provides embodiments including various explicit text entry methodologies, such as 2-key and long pressing. The invention also provides means for matching words in a database using build around methodology, stem locking methodology, word completion methodology, and n-gram searches.

More specifically, the present invention relates to a method and apparatus for explicit filtering in an ambiguous text entry mode, for extending and interpreting objects, words, word stems, and the like, and for stem-locking. One specific embodiment of explicit filtering for reducing ambiguity uses a variety of explicit entry means, including a 2-key explicit entry feature, wherein a key depression in combination with a matrix display are used. An extending and interpreting methodology is provided wherein complex phrases are allowed to be typed in. Predetermined sets of characters are "built around" as anchors for the end or beginning of new words or word stems. Reasonable guesses are offered for extending words by "n-gram" analysis of preceding explicit letters. Specifically, three specific embodiments using stem-locking are provided, wherein the first embodiment uses a combination of the n letters of a desired object, such as a word, and a next key. The second embodiment locks in the stem portion of the object and resolves the unlocked portion of the object. The third embodiment uses n-gram searches.

Figure 1:
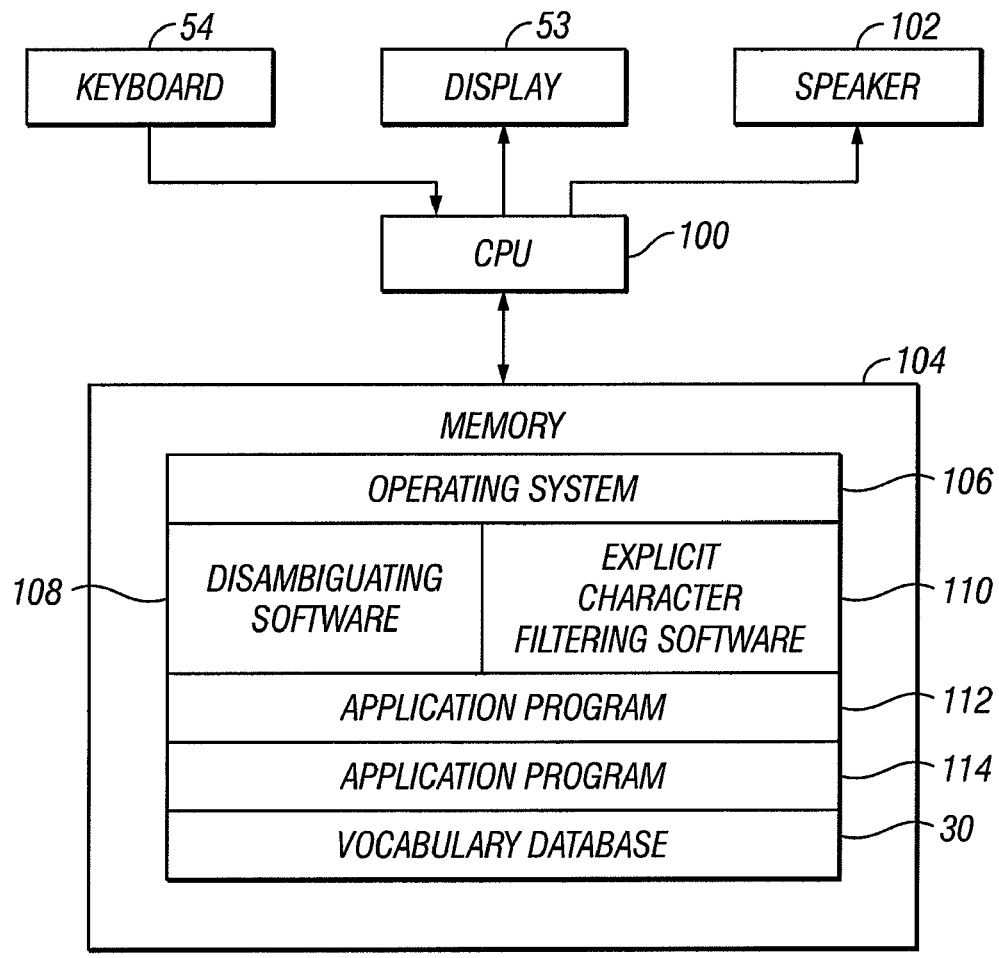
FIG. 1 is a hardware block diagram of the explicit character filtering system according of the invention.

A block diagram of a preferred embodiment of the reduced keyboard disambiguating system hardware is provided in FIG. 1. The keyboard 54 and the display 53 are coupled to a processor 100 through appropriate interfacing circuitry. Optionally, a speaker 102 is also coupled to the processor. The processor 100 receives input from the keyboard, and manages all output to the display and speaker. Processor 100 is coupled to a memory 104. The memory includes a combination of temporary storage media, such as random access memory (RAM), and permanent storage media, such as read-only memory (ROM), floppy disks, hard disks, or CD-ROMs. Memory 104 contains all software routines to govern system operation. Preferably, the memory contains an operating system 106, disambiguating software 108, and associated explicit character filtering in ambiguous text entry software and/or extending and interpreting software 110 that is discussed in additional detail below. The memory also includes a vocabulary database 30. Optionally, the memory may contain one or more application programs 112, 114. Examples of application programs include word processors, software dictionaries, and foreign language translators. Speech synthesis software may also be provided as an application program, allowing the reduced keyboard disambiguating system to function as a communication aid. Therefore, the output, in this case, might be vocally output from the speaker.

It should be appreciated and understood by one of ordinary skill in the art that the discussion applies to symbols and sequences of symbols, which, when combined make an object or part of an object. A typical example of a symbol is a character in any language, such as a letter, digit, punctuation mark, or any other symbol from a language. A typical example of an object or part of an object is a word or part of a word. However, the discussion herein equally applies to Japanese kana and Korean jamos. Also, it should be noted that the objects don't have to be linguistic, as the claimed disambiguating system herein can be used to look up icons, phone numbers, or inventory records, as long as a type of symbolic string representation is present. Therefore, it should be appreciated that use of the terms such as letter, word, word stem, and the like are not limited to only those applications, and are used to facilitate ease of reading and understanding the discussion herein.

Explicit Entry

Figure 2:
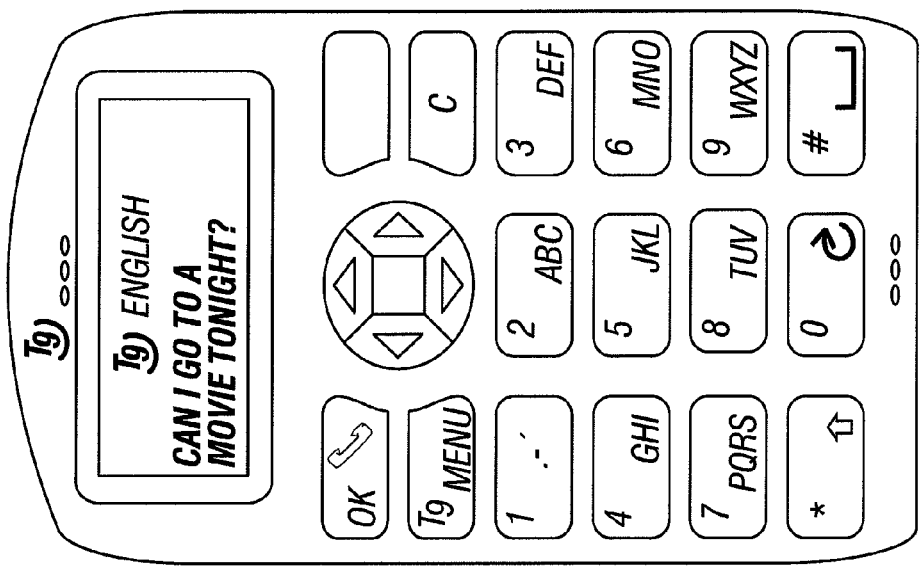
FIG. 2 is a picture of a wireless handheld device showing each letter of the English alphabet associated with a key according to the invention.

One preferred embodiment of generating an explicit character for the purpose of filtering word choices according to the invention provides a 2-key explicit entry feature. In many languages, such as English, all the letters associated with a key are printed on the key, such as depicted in FIG. 2, where FIG. 2 is a picture of an example wireless handheld device showing each letter of the English alphabet associated with a key according to the invention.

Figure 4:
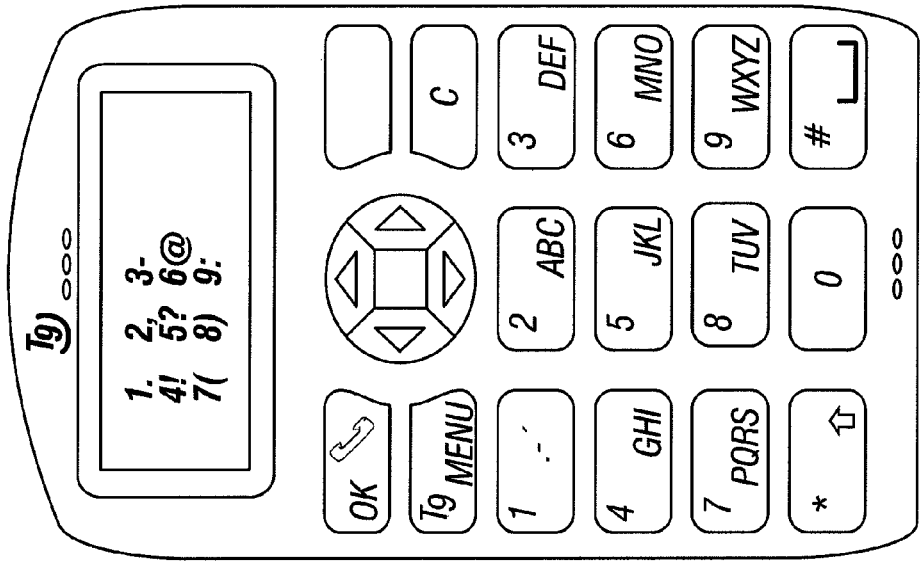
FIG. 4 is a sample screenshot of one 2-key matrix input method according to the invention.

However, other languages, such as French, include many more letters than can visually fit on a key, such as the cell phone key. FIG. 3 is an example chart of European letters and some special symbols shown on the 0-9 keys and their respective Shift keys. For example, if a user presses the 5 key, then a matrix display with the alphanumeric characters j, k, l, and 5 appear. FIG. 4 is a sample screenshot of one 2-key matrix input method according to the invention. After the first key has been pressed, the matrix of choices is displayed on the device panel. It should be appreciated that other labels printed on keys are possible, such as, for example, each key including a subset of predetermined sets of associated letters, such as displaying the first and last character of predetermined sets of associated letters.

Figure 5:
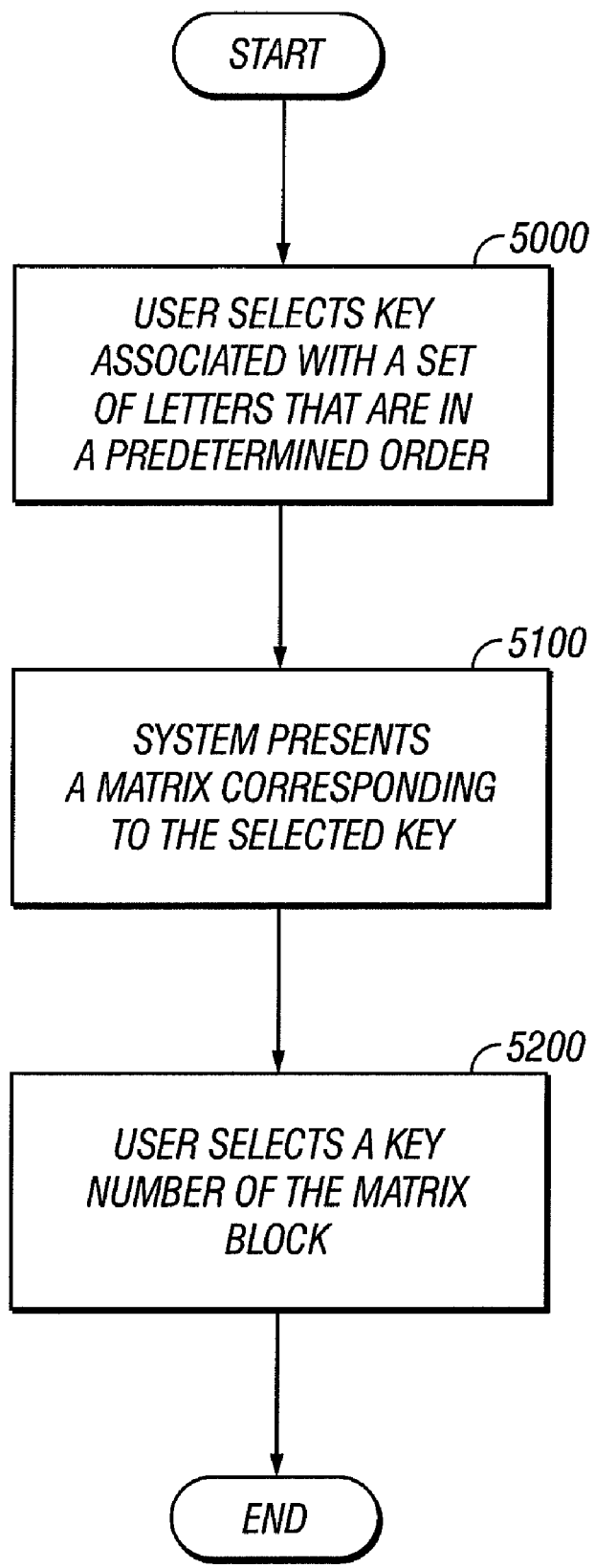
FIG. 5 is a flow chart of 2-key explicit entry for the explicit character filtering in ambiguous text entry system of FIG. 1.

FIG. 5 is a flow chart of 2-key explicit entry for the explicit character filtering in ambiguous text entry system of FIG. 1. According to a preferred embodiment of the invention, for a user to explicitly select one of many letters assigned to a key, as in the case of the French language, the user selects, such as by depression, the associated key (5000). The selection, e.g. depression, of the desired key causes the system to presents a second set of letters, such as in matrix form, that corresponds to the selected key (5100). Each block in the matrix includes a letter from the set of letters associated with the just selected/depressed key. FIG. 4 shows an example of what is displayed as a result of depressing the 1 key. All that is required at this point is for the user to select the key number of the matrix block that includes the desired character (5200). This explicit selection process only requires at maximum 2 key selections/depressions for the selection of a letter.

It should be readily apparent to one of ordinary skill in the art that the 2-key explicit entry method for the purpose of filtering can be extended to any other language. It should also be apparent to one of ordinary skill in the art that alternate configurations are possible, such as, for example, a scrolling list.

Figure 8:
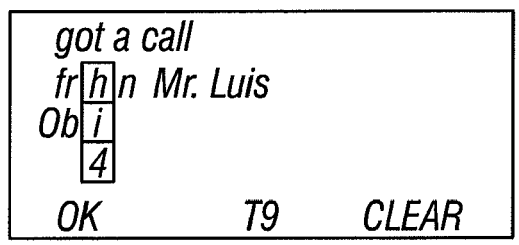
FIG. 8 shows an example of explicit entry by long-pressing on a key according to the invention.

According to an alternate configuration, the user selects a key by way of a long-press to display and cycle through the character sequence on that key. As shown in FIG. 8, some or all of the characters may scroll past in a preview window as long as the key is being pressed. When the key is released, the last highlighted character is accepted.

In yet another configuration, after the character sequence is presented by way of the long-press on the key, the character appears or is highlighted each additional time the key is pressed. The presentation of each explicit character may end when a sufficient time elapses between one key press and the next or when a different key is pressed.

In yet another configuration, after the character sequence is presented by way of the long-press on the key, the character appears or is highlighted each additional time a navigation key is pressed, where a navigation key is, for example, an arrow key or a scrolling wheel.

Following is a list of other explicit entry means for filtering. It should be appreciated that the list is meant by example only, and is not exhaustive:

- long pressing on a key to enter a number/digit explicitly;
- changing to a numbers mode and pressing a key to enter a number/digit explicitly (and then returning to ambiguous entry mode for filtering);
- changing to a multi-tap mode and pressing a key repeatedly to enter a character explicitly (and then returning to ambiguous entry mode for filtering);
- interpreting ambiguous mode key presses as an explicit character, either by grouping each pair of key presses as a 2-key explicit entry, or by grouping repeated presses of the same key as a multi-tap entry;
- using multi-switch keys, such as a 5-way rocker, which permits ambiguous entry on a simple press and an explicit character entry on a different kind of press; and
- by "chording," which means by pressing more than one key simultaneously, with a primary key indicating an ambiguous set of characters and a secondary key indicating which character in the set to select (e.g., on a video game controller).

Another means of explicit entry for filtering is when any character assigned to a key is offered to the user through a secondary means, e.g., displayed on the label of a programmable key, or "softkey", which if chosen would be entered explicitly. The softkey mechanism allows correction of the last keystroke entered, e.g., if the user is extending a word with additional characters or wishes to correct the displayed interpretation before the entire word is entered. The additional character offered would be based on an analysis of the most likely character associated with the preceding keystroke, or based on the words in the current word candidate list. Assuming the most likely character was already displayed in the ambiguous word choice, then the second most likely character would be offered. For instance, if the user wants to type "ram" and enters the key sequence 726, the word "ran" appears. The most likely letter for that position in the word candidate list associated with 726 is "m", then "m" could be offered on the softkey. When the user presses the softkey, the "m" replaces the "n" in the word "ran".

Explicit Character Filtering in Ambiguous Mode

Explicit character filtering in ambiguous mode is when a character is explicitly entered during entry of a sequence of ambiguous entries. One embodiment of explicit entry already discussed is the 2-key explicit entry method using a matrix as described above. According to another preferred embodiment of the invention, explicit entry of a character is accomplished by a long depression of the associated key. When one or more characters in a sequence of characters is explicitly entered, only stored words with that explicitly selected character(s) in the corresponding position(s) are retrieved.

One way of retrieving the desired word according to one embodiment of the invention is when an explicit character is entered in ambiguous entry mode, then the disambiguating filtering system continues to match database words against the ambiguous and explicit letters as long as possible, rather than accepting the default word upon the first explicit letter. If there is no match, the last ambiguous word selected is accepted and a new letter is appended to it.

As an example, suppose a user wants to enter the word "home" in English T9. The user long presses the 6 key in the $3^{rd}$ position to explicitly select "m," resulting in only "home," and, in addition, word stems "imme" and "gome" after 4 keystrokes.

Another example is using a mixed alphanumeric word like "cu2night", which could be stored in a database. If the user long presses on the 2 key, then explicitly enters a "2," words such as "cub" are thus filtered out from the word candidate list.

Explicit filtering is another way to quickly offer word completions. If "cu2night" was in a database, and "cu" was entered ambiguously followed by "2" explicitly, all ambiguous interpretations of the keystroke sequence "282" will be filtered out, leaving "cu2night" as a more likely choice to be offered through word completion.

Figure 6:
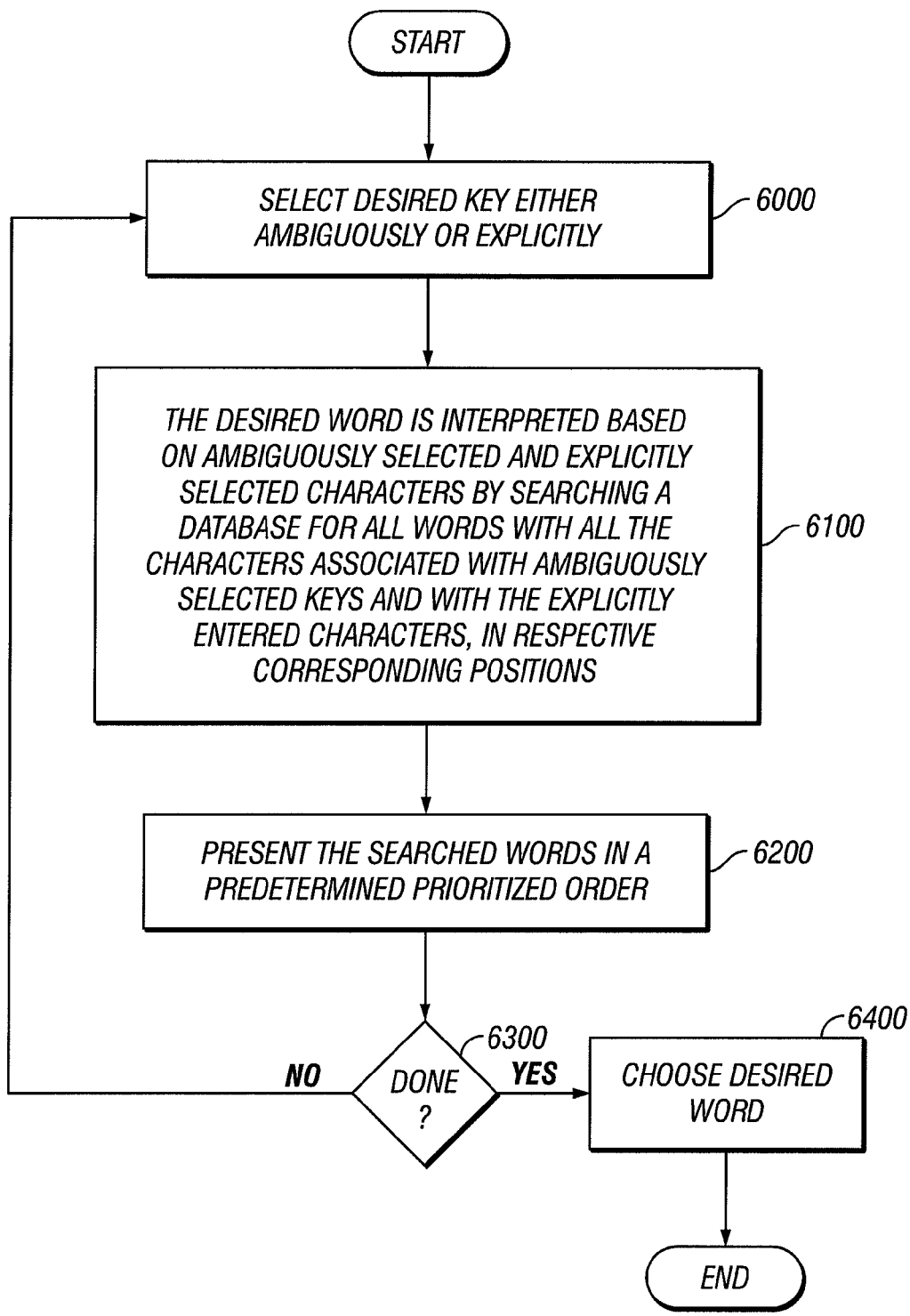
FIG. 6 is a flow chart for explicitly filtering in ambiguous mode according to a preferred embodiment of the invention.

FIG. 6 is a flow chart for explicitly filtering in ambiguous mode according to a preferred embodiment of the invention. A character is desired and its associated key is entered either ambiguously or explicitly (6000). The desired word is then interpreted based on the sequence of ambiguously selected keys (i.e. their associated characters) and the explicitly selected characters. The database is searched for words with the characters associated with ambiguously selected entries, e.g. keys, and with the explicitly entered characters, in their respective corresponding positions (6100). The searched words are then presented or displayed in a predetermined prioritized order (6200), such as a most frequently used order. If the desired word is among the set of presented searched words (6300), then the desired word is chosen (6400) and the process ends. Otherwise, the process is not over and steps are repeated from selecting a desired key (6000).

Build Around

In another aspect of the disambiguating filtering system, words from the database can be "built around" explicitly or ambiguously entered characters, or, additionally characters from a predetermined set of characters. According to one interpretation, the matching words, if any, include the explicit character for a particular sequence. However, additional interpretations of the sequence may include: one or more words that match the ambiguous keys that precede and/or end with the explicit character; one or more matching words that begin with the explicit character if any; and one or more words that match the ambiguous keys that follow the explicit character. For example, if the key sequence for "gifts4less" is entered, with the digit "4" entered explicitly, the words "gifts" matches the ambiguous key sequence preceding the explicit character and "less" matches the key sequence following it, even if "gifts4less", "gifts4", and "4less" are not found in the database. Similarly, "mobile.com" may be typed as one word automatically constructed from the database entries "mobile" and ".com", or from the entries "mobile" and "." and "com" if there is a key for ambiguous punctuation; in either of those cases the period may not need to be explicitly entered.

Figure 9:
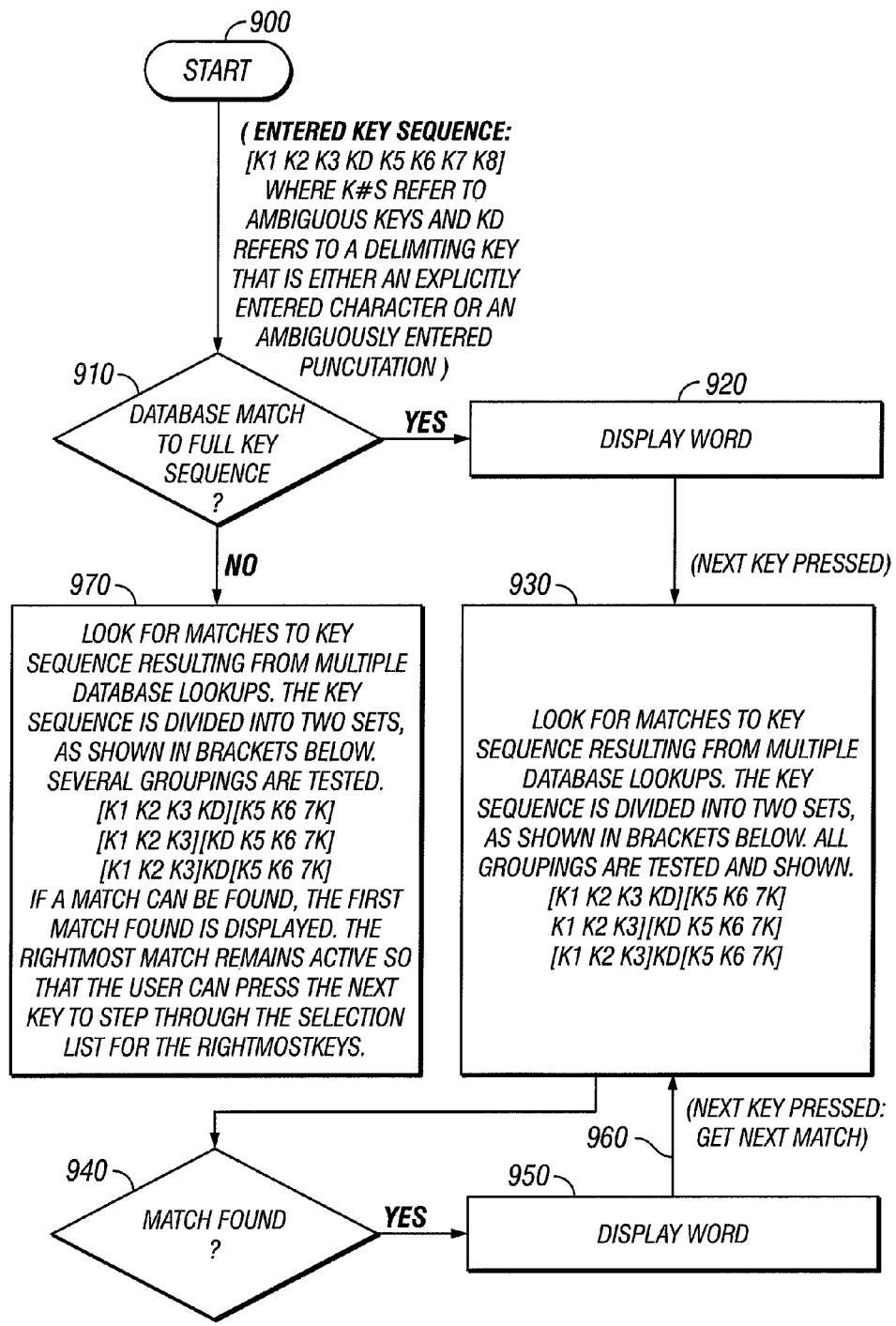
FIG. 9 is a flow chart depicting a build around example according to the invention.

One embodiment of the build around concept can be described with reference to FIG. 9, a flow chart depicting a build around example. The build around method starts (9000) with a key sequence being entered, e.g., [k1 k2 k3 kd k5 k6 k7 k8]. The k#'s refer to ambiguously entered keys and kd refers to a delimiting key that can be either an explicitly entered character an ambiguously entered punctuation character. The method then determines if the database found a match (9100). If yes, a word is displayed (9200). If the user desires to proceed to the next choice in the list of words found by the database, the user presses a next key to request further look-ups by the database (9300). Specifically, the database is multiply searched for matches to key sequences. A key sequence is divided into two sets on either side of a delimiter. An example of various groupings of two sets of sequences divided by a delimiter follows:

[k1 k2 k3 kd] [k5 k6 k7 k8];
[k1 k2 k3] [kd k5 k6 k7 k8]; and
[k1 k2 k3] kd [k5 k6 k7 k8].

If a match is found among any of the groups (9400), then the desired word is chosen and displayed (9500). If the user desires to build around this sequence, the user can press a next key to obtain the next set of results from multiple searches to the database (9600).

If the database did not find an initial match (9100), then the database is multiply searched for matches to key sequences (9700), wherein a key sequence is divided into two sets on either side of a delimiter, description of which and examples of which are presented above.

It should be appreciated that means to search for and display/present the set of possible desired words can vary and still remain within the scope and spirit of the invention.

Stem-locking

In the preferred embodiment of the invention, stem-locking is locking one or more subsequences or substrings of characters within a sequence. For example, the first n-numbers of sequence of characters of a word can be locked in. The way stem-locking works is that only words with those locked in characters are searched. For instance, suppose a user selects the 4 and then the 6 key of a wireless cell phone using T9 technology. The word "go" is presented in the display. If "go" is locked in, then upon subsequent key selections, only words with "go" in the first two positions are selected.

The locking of letters can be performed in a number of different ways. For example, two such ways are by a "full next locking" mechanism and an "unbounded" methodology by moving a cursor over characters to select. As an example of implementing "full next locking," a "next" key is used. That is, according to one embodiment of the invention, selecting a "next" key locks in a previously presented series of characters, thereby eliminating the possibility of the system re-interpreting the object by re-interpreting the locked in series of characters. The selected series of characters are now marked as explicitly entered. An example of moving the cursor over characters (unbounded) according to one embodiment of the invention, the cursor is moved to the beginning of a series and by the user selecting a right-arrow key (or a left-arrow key, for example, in the Hebrew language), all the characters that the cursor moved over are locked in.

Another aspect of full next locking is locking a previously presented series of characters when likely word boundaries are identified. Such boundaries can be identified based on certain sequences of interactions, such as, for example, when the user "nexts" and then selects a symbol or punctuation character; or, when the user "nexts" and then enters an explicit number.

It should be appreciated that other methods to "lock" include, but are by no means limited to:

pressing a key assigned to the "lock" function, such as an OK or Select key; and pressing an appropriate arrow key to "lock" in a word completion being offered.

Stem locking approaches, such as those discussed above, can be related to "build around" as described herein above. That is, once a sequence has been locked in, it can be "built around."

Japanese Kana Example

Another example of the disambiguating filtering methodology is in the Japanese language. Sub-phrases in kana (phonetic) character form can be converted to kanji (Yomikata), and those converted sub-phrases may in turn filter interpretations of the remaining ambiguous kana preceding or following the converted sub-phrases, excluding interpretations that can't be used to construct valid phrases.

In another embodiment of the invention, a hierarchy of locks mechanism is used. For example, a right arrow key can lock in all characters to the left of the cursor. Therefore, in this implementation, a right-arrow key locks in a first-choice stem, while a "next" key locks in a not-first-choice stem.

Another implementation is using a "select" key instead of a right-arrow key in combination with a "next" key. For example, the "select" key can be used at the end of each ambiguous key sequence for either selecting and accepting the default choice (the select key is pressed once) or for selecting an alternative choice (the select key is pressed more than once until the desired choice appears or is highlighted). In this case, the "select" key is used to stem lock either the first or alternate choices, rather than using the right-arrow key for the first choice and the "next" key for other choices (or vice-versa, as the choice of keys is arbitrary, yet predetermined).

Word Extension and Completion

Another aspect of the invention is the system automatically starting a new word at a lock position. For example, the user enters "car" and locks it, and then enters the keys for "pet". "Carpet" is shown because it is a complete word in the database. The word "carset" is also shown because it is "car"+ "set", which is another example of the "build around" concept, where an ambiguous sequence may follow an explicit character entry, causing one interpretation to be the beginning of a new ambiguous word.

Alternatively, when one or more previously-accepted characters precedes (is adjacent to, without spaces) the current and active ambiguous key sequence. The system uses the preceding characters to match words and phrases (e.g., in the user database) that begin with those characters and that match an ambiguous key sequence following those characters. Optionally, one or more word completions is offered. An example follows. A user enters and locks in (accepts) the characters, "con." Then, the user types ambiguous keys for "scan" and is offered "constantinople" as a word completion. In this example, the user could have used a left-/right-arrow key to accept "con" to be used to filter and to suggest word completions that begin with the accepted chars and are immediately adjacent to an ambiguous key sequence. Hebrew and other languages go the other direction, hence right-side-only is not assumed.

Figure 7:
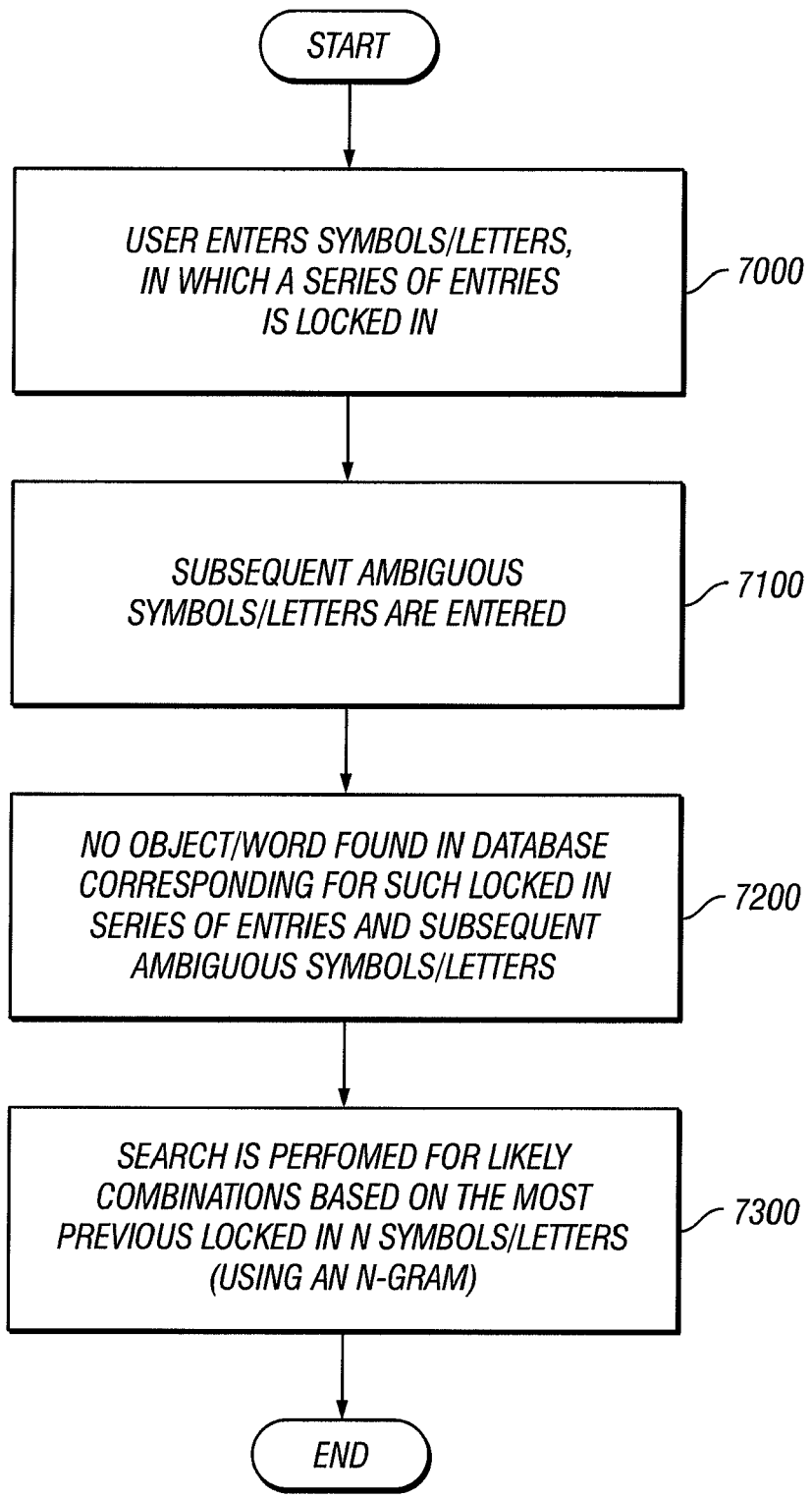
FIG. 7 is a flow chart of a method for generating words not stored in the database according to the invention.

FIG. 7 is a flow chart of a method for generating words not stored in the database according to the invention. That is, in an equally preferred alternate embodiment, if a series of entries is locked in (7000) and subsequent ambiguous characters entered (7100) and a corresponding stored word is not found in the database (7200), then searches are performed for likely combinations based on the previous n locked in characters (7300). In one preferred embodiment of the invention, an n-gram is used to find stored words. This is contrary to using the entire set of locked in letters. For example, suppose a user has entered and explicitly selected the word "flight", but the user, however, wants to enter the word "flightplan" which is not in the database. In this embodiment of the invention, the user then explicitly locks in the letter "p" and "l" after "flight". The system then searches for words using the last explicitly entered bigram (p and l). Thus, words that are not stored in the database are generated.

Although the invention is described herein with reference to the preferred embodiment, one skilled in the art will readily appreciate that other applications may be substituted for those set forth herein without departing from the spirit and scope of the present invention.

Accordingly, the invention should only be limited by the Claims included below.

The invention claimed is:

1. An apparatus for explicit character filtering of ambiguous key input sequences from a reduced keyboard, said apparatus comprising:

a processor, wherein said processor manages output of objects to a display operatively coupled to said processor;

a keyboard comprising a plurality of keys, said keyboard being operatively coupled to the processor through appropriate interfacing circuitry, wherein at least some of said keys are associated with at least two characters, wherein said keyboard is configured to accept a plurality of types of key inputs including:

one-tap key inputs, wherein one-tap key inputs of said keys associated with at least two characters comprise an ambiguous key input, and at least one alternate type of key input that comprises the explicit entry of a single intended character;

wherein said processor receives at least one sequence of key inputs from said keyboard, and wherein said at least one sequence of key inputs includes any one of an ambiguous key input and an explicitly entered character input in a particular position within a sequence of key inputs, wherein said particular position is a position of any one of the at least one sequence of key inputs;

a means for distinguishing said at least one explicitly entered character input from an ambiguous key input;

a memory coupled to said processor, wherein said memory comprises:

an object database, wherein objects are associated with sequences of key inputs;

a means for disambiguating the at least one sequence of key inputs at an object level, wherein a set of candidate objects associated with said at least one sequence of key inputs is identified; and a means for filtering the set of candidate objects, wherein objects from the set of candidate objects which do not contain said at least one explicitly entered character input in said particular position within the sequence of key inputs are filtered out of the set of candidate objects thereby forming a filtered set of candidate words, wherein only the filtered set of candidate objects are output to said display;

wherein said characters comprise letters, digits, punctuation marks, Japanese kana, Korean jamos, and icons; and wherein objects comprise sequences of characters, words, part of words, word stems, icons, phone numbers, and inventory records.

2. The apparatus of claim 1, further comprising speech synthesis software and a speaker as a communication aid.

3. The apparatus of claim 1, further comprising means for entering an explicit character by any of or any combination of, but not limited to:
   2-key explicit entry;
   long pressing a key to display and cycle through a character sequence;
   long pressing on a key to enter a number/digit explicitly;
   changing to a numbers mode and pressing a key to enter a number/digit explicitly;
   changing to a multi-tap mode and pressing a key repeatedly to enter a character explicitly;
   interpreting ambiguous mode key presses as an explicit character, either by grouping each pair of key presses as a 2-key explicit entry, or by grouping repeated presses of the same key as a multi-tap entry;
   using multi-switch keys, thereby permitting ambiguous entry on a simple press and an explicit character entry on a different kind of press;
   chording by pressing more than one key simultaneously, with a primary key indicating an ambiguous set of characters and a secondary key indicating which character in the set to select; and
   using a softkey as a secondary means for offering any character assigned to a key based on analysis of most likely character associated with a preceding keystroke or based on words in a current word candidate list.

4. The apparatus of claim 3, further comprising a means for entering an explicit character by 2-key explicit entry comprising use of at least one of:
   a matrix display;
   a label including a subset of predetermined sets of associated characters; and
   a scrolling list.

5. The apparatus of claim 3, wherein long pressing a key to display and cycle through a character sequence further comprises, after a character sequence is displayed, either of,:
   a next character in said character sequence is highlighted each additional time said key is pressed, ending after a sufficient time elapses between one key press and the next or when a different key is pressed; or
   a next character in said character sequence is highlighted each time a navigation key is pressed.

6. The apparatus of claim 1, further comprising:
   means for entering an explicit character by long pressing a specific key to display and cycle through a character sequence, and at least one of:
      means for, after said character sequence is displayed, highlighting a next character in said character sequence each time said specific key is pressed, ending after a sufficient time elapses between each press of said specific key or when a key other than said specific key is pressed; and
      means for, after said character sequence is displayed, highlighting a next character in said character sequence each time a navigation key is pressed.

7. The apparatus of claim 1, said explicit character filtering software further comprising:
   means for matching said objects in said database against explicitly entered characters and ambiguously entered characters as long as possible, rather than accepting a default word upon a first explicitly entered character.

8. The apparatus of claim 1, further comprising:
   means for selecting a desired object from said filtered set of candidate objects.

9. The apparatus of claim 8, wherein said candidate objects are presented in a predetermined order.

10. The apparatus of claim 1, said means for explicit character filtering of the identified objects further comprises a means for building an object around at least one delimiting character.

11. The apparatus of claim 10, wherein said means for building an object around at least one delimiting character further comprises at least one means from a group consisting of:
   means for interpreting by matching objects which include explicitly entered characters for a particular sequence;
   means for interpreting by matching objects which include at least one object that matches ambiguous keys that precede said at least one delimiting character;
   means for interpreting by matching objects which include at least one object that matches ambiguous keys that end with said at least one delimiting character;
   means for interpreting by matching objects which include at least one object that begins with said at least one delimiting character; and
   means for interpreting by matching objects which include at least one object that follows said at least one delimiting character.

12. The apparatus of claim 10, wherein said means for building an object around at least one delimiting character is actuated by pressing a next key to obtain a next set of results from multiple searches in said object database.

13. The apparatus of claim 1, said means for explicit character filtering of the identified objects further comprises a means for stem locking for eliminating re-interpreting at least one series of characters by marking said at least one series of characters as explicitly entered.

14. The apparatus of claim 13, said means for stem locking further comprising at least one from a group consisting of:
   a full next locking mechanism, wherein a next key press locks one of said at least one series of characters;
   unbounded locking by moving cursor over one of said at least one series of characters by using an arrow key;
   means for using previously explicitly entered characters preceding said at least one sequence of key inputs by matching objects in said database, wherein said objects begin with said explicitly entered characters and match said ambiguously entered key sequence;
   object completion capability;
   means for allowing pressing a key to be assigned to a locking in function;
   means for allowing pressing an appropriate arrow key to lock in a word completion being offered;
   a hierarchy of locking mechanism; and
   means for generating objects when a desired object is not stored in said object database.

15. The apparatus of claim 14, said full next locking mechanism further comprising means for identifying and using word boundaries.

16. The apparatus of claim 14, said means for generating objects when a desired object not stored in said object database further comprising:
   means for receiving a first set of characters comprising a series of locked in entries;
   means for receiving a subsequent ambiguous entry associated with a second set of characters;
   means for searching said database for a first desired object using said entered first set of locked in characters;

means for allowing selecting said first desired object, responsive to said first desired object being found in said database; and means for performing at least one subsequent search by locking in and searching on a subset of said second set of characters for a second desired object in said object database;

means for allowing selecting said second desired object, responsive to said second desired object being found in said object database;

wherein said desired object comprises said first desired object and said second desired object.

17. A method for explicit character filtering of key input sequences, said method comprising the steps of:

operatively coupling a processor with a display, wherein said processor manages output of objects to a display;

operatively coupling said processor with a keyboard, said keyboard comprising a plurality of keys, wherein at least some of the keys are associated with at least two characters, wherein one-tap key inputs of said keys associated with at least two characters comprise an ambiguous key input, and wherein non-one-tap key inputs of said keys associated with at least two characters comprise an explicit key input that specifies precisely one intended character, wherein said processor receives at least one sequence of key inputs from said keyboard, and wherein said at least one sequence of key inputs includes any one of an ambiguous key input and an explicitly entered character input in a particular position within a sequence of key inputs, wherein said particular position is a position of any one of the at least one sequence of key inputs;

distinguishing a non-one-tap key input from a one-tap key input;

providing a memory coupled to said processor, wherein said memory comprises:
an object database; and
disambiguating ambiguous key inputs in said key input sequences;

identifying objects in said object database that are associated with the sequence of key inputs, forming identified words; and filtering objects from the identified objects based on the input of at least one intended character in said particular position within the sequence of key inputs, forming filtered objects; and causing an output to said display of said filtered objects;

wherein said characters comprise letters, digits, punctuation marks, Japanese kana, Korean jamos, and icons; and wherein objects comprise sequences of characters, words, part of words, word stems, icons, phone numbers, and inventory records.

18. The method of claim 17, further comprising providing speech synthesis software and a speaker as a communication aid.

19. The method of claim 17, wherein the step of recognizing a non-one-tap key input from a one-tap key input is accomplished by techniques selected from among a group of precise character entry techniques consisting of:

2-key explicit entry;
long pressing a key to display and cycle through a character sequence;
long pressing on a key to enter a number/digit explicitly;
changing to a numbers mode and pressing a key to enter a number/digit explicitly;
changing to a multi-tap mode and pressing a key repeatedly to enter a character explicitly;

interpreting ambiguous mode key presses as an explicit character by grouping each pair of key presses as a 2-key explicit entry;

interpreting ambiguous mode key presses as an explicit character by grouping repeated presses of the same key as a multi-tap entry;

using multi-switch keys, thereby permitting ambiguous entry on a simple press and an explicit character entry on a different kind of press;

chording by pressing at least two keys simultaneously, with a primary key indicating an ambiguous set of characters and a secondary key indicating which character in the set to select; and using a softkey as a secondary means for offering any character assigned to a key based on analysis of most likely character associated with a preceding keystroke based on words in a current word candidate list.

20. The method of claim 19, further comprising entering a precisely intended character by 2-key explicit entry, wherein said 2-key explicit entry further comprises use at least one of:
a matrix display;
a label including a subset of predetermined sets of associated characters; and
a scrolling list.

21. The method of claim 17, further comprising entering an intended character by long pressing a key to display and cycle through a character sequence, wherein said cycling through a character sequence further comprises, after said character sequence is displayed, at least one of:

highlighting a next character in said character sequence each time said specific key is pressed, ending after a sufficient time elapses between each press of said specific key or when a key other than said specific key is pressed; and highlighting a next character in said character sequence each time a navigation key is pressed.

22. The method of claim 17, said means for filtering objects from the identified objects based on the at least one intended character further performing the step of:

matching said objects in said object database against said intended character; and automatically accepting for output an object matching a first subset of the input sequence when entry of an additional input prevents the matching of at least one object in said database.

23. The method of claim 17, said explicit character filtering software further comprising:

selecting a desired character either ambiguously or explicitly, thereby actuating interpreting candidate desired objects using said ambiguously selected and explicitly selected characters by searching said object database for objects with characters associated with said ambiguously selected keys and with said explicitly selected characters, said characters in respective corresponding positions, and presenting said searched objects;

determining whether a desired object is among said presented searched objects;

if said desired object is not among said presented searched objects, repeating method from said selecting a desired key step; and selecting said desired object.

24. The method of claim 17, wherein said filtered objects are displayed in a predetermined order.

25. The method of claim 17, wherein said filtered objects are displayed in a prioritized order.

26. The method of claim 17, said means for filtering objects from the identified objects based on the at least one intended character further performing the step of building an object around at least one intended character.

27. The method of claim 26, wherein said building an object around at least one intended character further comprises at least one step from a group of steps consisting of:
   interpreting by matching objects which include said at least one intended character at a particular position in said sequence of key inputs;
   interpreting by matching objects which include at least one object that matches ambiguous keys that precede said at least one intended character;
   interpreting by matching objects which include at least one object that matches ambiguous keys that end with said at least one intended character;
   interpreting by matching objects which include at least one object that begins with said at least one intended character; and
   interpreting by matching objects which include at least one object that follows said at least one intended character.

28. The method of claim 26, wherein said building an object around at least one intended character is actuated by pressing a next key to obtain a next set of results from multiple searches in said object database.

29. The method of claim 17, said means for filtering objects from the identified objects based on the at least one explicit input further performing the step of stem locking for eliminating re-interpreting at least one series of characters by marking said series of characters as explicitly entered.

30. The method of claim 29, said stem locking further comprising performing at least one step from a group of steps consisting of:
   providing a full next locking mechanism, wherein a next key locks one of said at least one series of characters;
   providing unbounded locking by moving cursor over one of said at least one of said series of characters by using an arrow key;
   using previously explicitly entered characters preceding a current sequence of key inputs by matching objects in said object database, wherein said objects begin with said intended characters and match said sequence of key inputs;
   providing object completion capability;
   allowing pressing a key to be assigned to a locking in function;
   allowing pressing an appropriate arrow key to lock in a word completion being offered;
   providing a hierarchy of locking mechanism; and
   generating objects when a desired object is not stored in said object database.

31. The method of claim 30, said full next locking mechanism further performing the step of identifying and using word boundaries.

32. The method of claim 30, said step of generating objects when a desired object is not stored in said object database further comprising the steps of:
   receiving a first set of characters comprising a series of locked in entries;
   receiving a subsequent sequence of key inputs entry associated with a second set of characters;
   searching said object database for a first desired object using said entered first set of locked in characters;
   allowing selecting said first desired object, responsive to said first desired object being found in said object database; and
   performing at least one subsequent search by locking in and searching on a subset of said second set of characters for a second desired object in said object database;
   allowing selecting said second desired object, responsive to said second desired object being found in said object database;
   wherein said desired object comprises said first desired object and said second desired object.

33. An apparatus for explicit character filtering of ambiguous text entry, said apparatus comprising:
   a keyboard and a display each coupled to a processor through appropriate interfacing circuitry, wherein said processor receives input characters from said keyboard and manages output objects to said display;
   a memory coupled to said processor, wherein said memory comprises:
     an operating system;
     disambiguating software;
     explicit character filtering in ambiguous text entry software; and
     an object database,
     wherein said explicit character filtering software, when executed by said processor:
       when one or more characters in a sequence of characters are explicitly entered, retrieves only stored objects from said object database having said explicitly entered characters in corresponding positions; and
       matches said objects in said database against explicitly entered characters and ambiguously entered characters as long as possible, rather than accepting a default word upon a first explicitly entered character;
   wherein said characters comprise letters, digits, punctuation marks, Japanese kana, Korean jamos, and icons; and
   wherein objects comprise sequences of characters, words, part of words, word stems, icons, phone numbers, and inventory records.

34. The apparatus of claim 33, said explicit character filtering software, when executed by said processor:
   selects a desired character either ambiguously or explicitly, thereby actuating interpreting candidate desired objects using said ambiguously selected and explicitly selected characters by searching said object database for objects with characters associated with said ambiguously selected keys and with said explicitly selected characters, said characters in respective corresponding positions, and presents said searched objects;
   determines whether a desired object is among said presented searched objects;
   if said desired object is not among said presented searched objects, continues execution from said selection of a desired character; and
   selects said desired object.

* * * * *